United States Patent [19]
Dukette

[11] 3,784,879
[45] Jan. 8, 1974

[54] RELAY MEMORY CIRCUIT
[75] Inventor: William J. Dukette, Washington Township, N.J.
[73] Assignee: American Associated Cybernetics, Inc., New York, N.Y.
[22] Filed: July 27, 1972
[21] Appl. No.: 275,527

[52] U.S. Cl. .............................................. 317/136
[51] Int. Cl. .......................................... H01h 47/00
[58] Field of Search .................................... 317/136

[56] References Cited
UNITED STATES PATENTS
3,296,499   1/1967   Quinlan .............................. 317/136

*Primary Examiner*—L. T. Hix
*Attorney*—Alfred L. Michaelsen and Charles B. Smith

[57] ABSTRACT

A circuit comprised of a plurality of relays, all of which are connected in parallel. The energization of any one relay automatically deenergizes and unlatches any previously latched relay.

11 Claims, 4 Drawing Figures

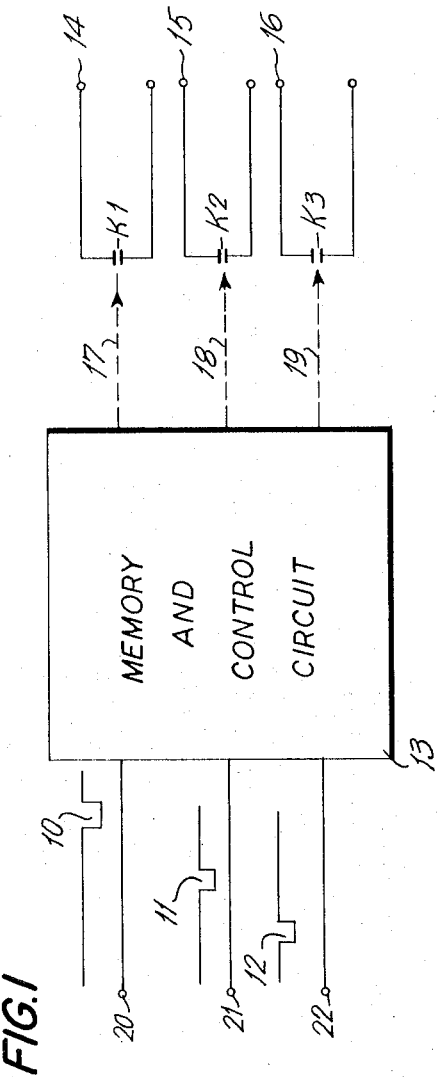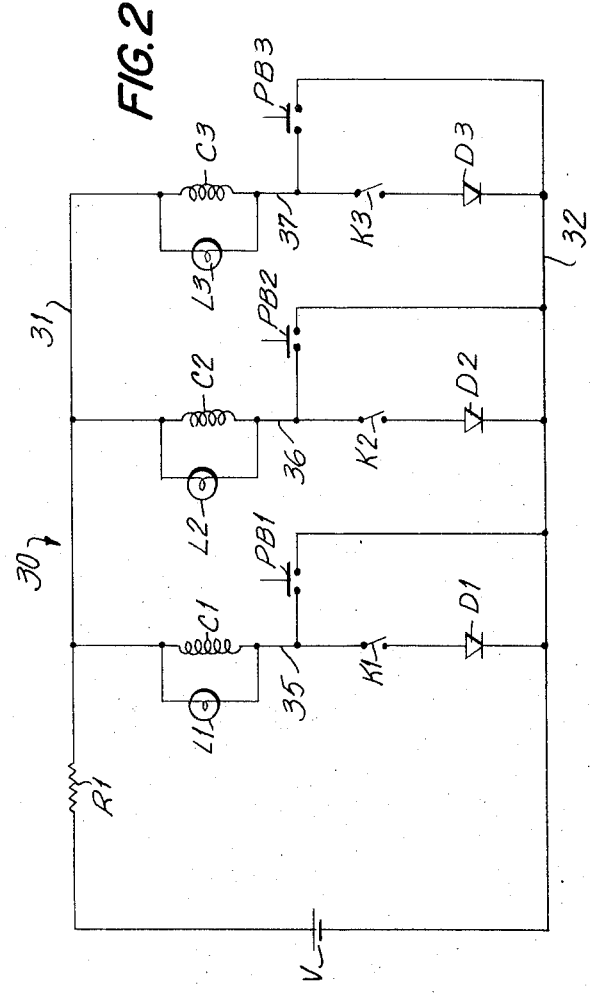

RELAY MEMORY CIRCUIT

BACKGROUND OF THE INVENTION

1. Field to Which the Invention Pertains

Many machines and processes require the use of circuits which provide both a memory and a control function. For example, machine tools and transfer machines often operate on the basis that an operating head must be moved from one point to another. Thus, considering a transfer machine, it is often desired that the operating head engage an article and move it from one point to another. At each particular point, an operation may be performed upon the article which is engaged and subsequent to that operation the article is moved to another point in space. Alternatively, depending upon the outcome of the operation which is performed at a particular point, it may be desired to move the article to one of a number of points. By way of example, the operating head of the transfer machine may engage an article located on a supporting surface and move it to a second point at which a dimension of the article is automatically checked. Depending upon the outcome of the dimensional check, the article may be deposited upon one of two conveyors, e.g., a conveyor for acceptable articles and a conveyor for non-acceptable articles.

When considering a machine operating according to a sequence of the type described above, it will be appreciated that the machine would have to be provided with means for receiving and remembering a command, e.g., a command to move from the pickup point to the measuring point. Further, after the article has arrived at the measuring point and the measurement has occurred, the same memory and control means must be capable of receiving a command which results from the decision based upon the measurement which has occurred. In addition, it wouldbe particularly desirable if, simultaneously with receiving such a command, the command which had been previously inserted in the memory was deleted or erased. Thus, stated in general terms, such a control and memory means would have the capability of assuming a particular state in response to a discontinuous command and maintaining that state until a new command was impressed thereupon, at which time the memory and control means would automatically assume a new state corresponding to the new command. Additionally, such a memory and control means should be low in cost and operate at a relatively high speed. A relay circuit having characterics of this type is the field to which this invention pertains.

2. Prior Art

In response to the need for providing control or memory functions, a vast number of relay circuits have been developed and are known to the prior art. Exemplary of such control circuits are those shown in U.S. Pat. Nos. 2,764,715, 3,003,088, 3,361,939, 3,573,782 and 3,629,608. Although the circuits which are disclosed in the aforementioned patents utilize relays, the capabilities of such circuits are limited and cannot provide both the control and memory functions hereinbefore described. For example, in U.S. Pat. No. 3,629,608 to Trindle, there is disclosed a circuit containing a relay and additional circuit means including a plurality of switches. The operation of the circuit is such that the relay may be actuated by the operation of any one of the plurality of switches. Thus, in this circuit, it is evident that only a single relay is employed and thus the control capabilities of the circuit are limited.

Similarly, the circuits disclosed in the other patents mentioned hereinbefore generally contemplate the use of a single relay. Of course, numerous circuits have been developed which employ a plurality of relays. However, such circuits are generally logic circuits which provide a control output in response to the closure of one or more contacts. While circuits of this type do provide a memory and control function, such prior art circuits are generally characterized by having a rather slow response time and, additionally, do not possess the capability that the circuit is cleared of all previously applied logic when a new command is impressed thereon.

SUMMARY OF THE INVENTION

A memory and control circuit which responds to a discontinuous imput signal so as to assume a responsive state and provide a continuous output signal, e.g., in the form of a contact closure. The circuit which embodies the invention includes a power source which provides power through a series resistor to a relay circuit. The relay circuit is comprised of a number of circuits all of which are connected in parallel. In each of the parallel circuits there is included a relay coil and an associated relay contact in series with the relay coil. Means are provided for selectively engaging each of the relay coils, e.g., by grounding the side of relay coil at the point at which it is connected to its associated relay contact. The energizing of one of the relay coils represents the response of the circuit to a command signal or information input to the circuit. There is additionally provided circuit means shunting each of the relay coils. Each of the shunting circuit means is characterized by having a resistance which is initially low but substantially increases with current flow, e.g., a light bulb. Increased operational speed may be obtained by maintaining one side of the relay circuit above ground.

DESCRIPTION OF THE DRAWINGS

FIG. 1 is a functional representation, in block diagram form, of a circuit embodying my invention.

FIG. 2 is a circuit diagram representing one embodiment of the invention.

DESCRIPTION OF THE INVENTION

Figure 3:
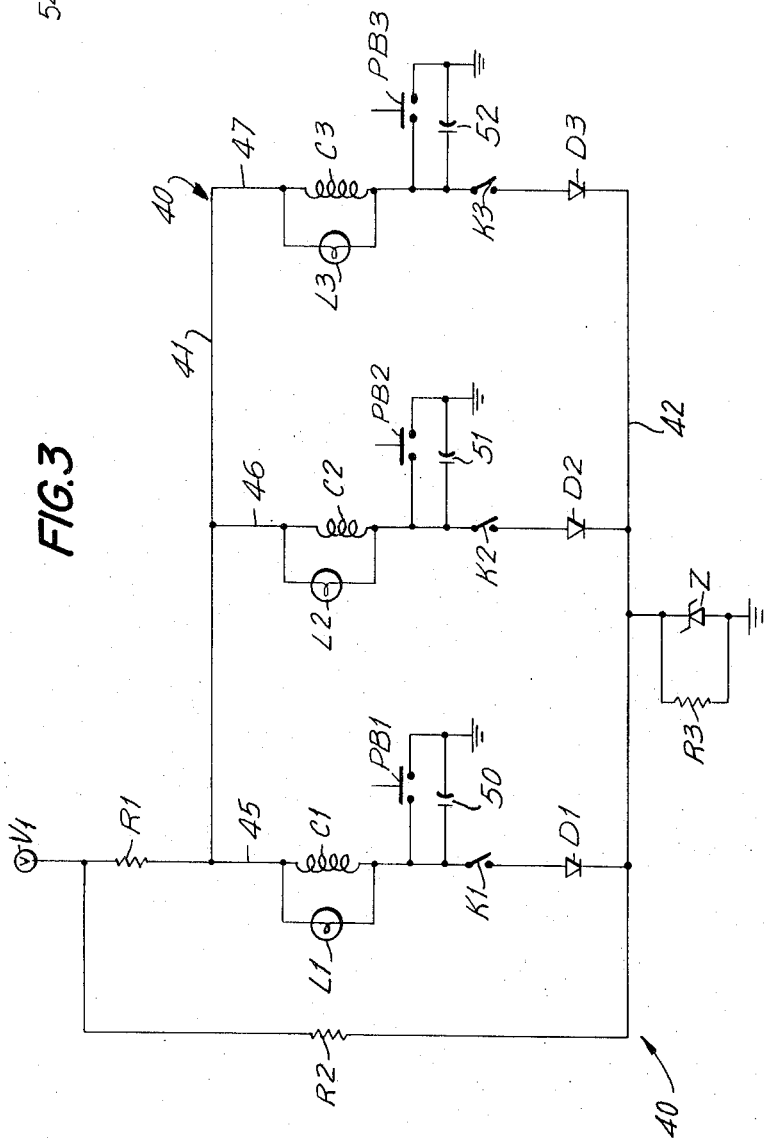
FIG. 3 is a circuit diagram representing the preferred embodiment of the invention.
Figure 4:
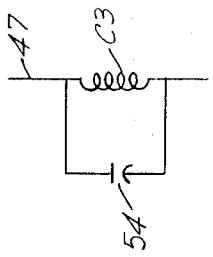
FIG. 4 is a fragmentary circuit diagram representing another embodiment of the invention.

FIG. 1 is a block diagram representation which functionally characterizes my invention. Thus, a circuit which embodies my invention is represented in FIG. 1 by the block 13. While the memory and control circuit of my invention may have any number of inputs, the representation of FIG. 1 assumes, for purposes of description, a three input configuration, i.e., associated with the circuit are three inputs 20, 21 and 22. Similarly, the memory and control circuit may actuate any number of output circuits. However, for purposes of description, the configuration of FIG. 1 has associated therewith three output circuits 14, 15 and 16. Each of the output circuits 14, 15 and 16 contains an output relay K1, K2 and K3, respectively, which are actuated by the memory and control circuit as indicated by the lines of actuation 17, 18 and 19.

In operation, a discontinuous command or input signal 10 may be supplied to the circuit at the input 20. Depending upon the particular embodiment of my invention which is employed, the pulse or discontinuous input signal 10 may be either a positive pulse or a negative pulse. Since the nature of the pulse is determined by the particular circuit configuration which is employed, it is only necessary, in this broad description of my invention, to note that the command signal or information input 10 is discontinuous. In other words, the pulse width and amplitude will be evident to those skilled in the art depending upon the elements which are used to construct the circuit.

Upon receipt of the pulse 10, the memory and control circuit 13 will close and latch output contact K1. Thereafter, output contact K1 will be maintained in its closed or latched position unitl a new control signal is received by the memory and control circuit 13. Thus, if a control or command pulse 11 is subsequently received at the input 21, two events will occur almost simultaneously. First, the memory and control circuit 13 will open or unlatch output contact K1. Second, the circuit 13 will close and latch contact K2. In a similar manner, if a control or command pulse 12 is subsequently provided at the input 22, the memory and control circuit 13 will open or unlatch output contact K2 and will close and latch output contact K3. Thus, it will be appreciated that the function performed by the memory and conrol circuit 13 is to receive a discontinuous command or input signal and, in response thereto, provide a continuous output signal while simultaneously erasing the effect of any previously received command or input signal. Two specific circuits which embody my invention will now be described.

Referring to FIG. 2, wherein there is disclosed one embodiment of my invention, a resistor R1 is connected in series to the output of a DC power source V. A relay circuit 30 is connected in series with the resistor R1 and the DC power source. As may be noted, the relay circuit 30 is comprised of a plurality of substantially identical circuits all of which are connected in parallel between one side of the circuit 31 and the other side 32. While a circuit which embodies my invention may employ almost any number of parallel circuits, for purposes of description the embodiment of my invention shown in FIG. 2 is comprised of three parallel circuits 35, 36 and 37. Since all of the elements of each of the parallel circuits are substantially identical, only one of the parallel circuits will be described in detail. Thus, referring to parallel circuit 35, it will be noted that a relay coil C1 is connected at one end to the side 31 of the relay circuit 30. The other end of the relay coil C1 is connected to one end of a contact K1. The other end of the contact K1 is connected to the anode of diode D1. The cathode of diode D1 is connected to the other side 32 of the circuit 30. The contact K1 is a relay contact which is actuated when current passes through the relay coil C1. As will be appreciated by those skilled in the art to which this invention pertains, contact K1 is thus acting as a maintaining contact for coil C1. Equally evident to those skilled in the art is the fact that a number of other contacts may be associated with relay coil C1. Thus, such other contacts (which are not shown in FIG. 2) would open and close in response to the presence or absence of current flow through relay coil C1 and would duplicate the action of the relay contact K1. Such other contacts would comprise the output or control contacts associated with the control and memory circuit of FIG. 2. That is to say, the output or control contacts which would be actuated by the circuit of FIG. 2 are not shown in FIG. 2 although it will be appreciated that they will respond in a manner identical to the response of the relay contacts which are shown.

Returning to a consideration of the circuit shown in FIG. 2 and the elements thereof and particularly the branch 35 thereof, a light bulb L1 is provided and shunts relay coil C1. Additionally, means are provided for grounding the end of the relay coil C1 which is connected to its associated relay contact K1. More specifically, in the embodiment of my invention shown in FIG. 2 the aforementioned grounding means is a push button PB1.

In operation, a momentary closure of one of the push buttons PB1, PB2, or PB3 would represent the command or input signal. For example, if switch PB1 is momentarily closed, current would flow from the power source V through the resistor R1 and then through the light bulb L1 to ground. However, it should be noted that, initially, almost no current will flow through the relay coil C1. The condition of no initial current through the relay C1 will occur for two reasons. First, at the instant when the contact PB1 is closed, the light bulb L1 has a very low resistance. Second, the relay coil C1 has a very high impedance with respect to any initial surge of current flow. However, as soon as current starts to flow in L1 the resistance of L1 will start to increase and will increase over a relatively short period of time, to a substantially high resistance, as compared to its resistance when it was cold. As the resistance of the light bulb increases, there is a continuous increase in the current which flows through the coil C1. Thus, depending upon the various circuit parameters, the resistance of the light bulb will, within the aforementioned short period of time, increase to a value such that sufficient current is flowing through the relay coil C1 as to pull-in the associated relay contact K1. Of course, during the period of time prior to the closing of the contact K1, all current flowing in the circuit 35 was flowing to ground through the closed push button PB1. Subsequent to the closure of contact K1, the push button PB1 may be released whereupon current flow will be maintained through the coil C1, the closed contact K1 and diode D1. Thus, in response to the momentary closure of the contact PB1, coil C1 has been actuated and latched through the maintaining contact K1. Similarly, any other output or control contacts associated with a coil C1 are closed and latched in response thereto.

Assuming that the relay contact K1 and any associated contacts have been closed and latched as described above, the automatic reset action of the circuit may be understood by assuming that an input or command signal is provided to one of the other inputs to the circuit. Thus, if contact PB2 is momentarily closed after relay contact K1 has been closed and latched, the following action will occur. At the instant when contact PB2 is closed, the voltage on the side 31 of the circuit 30 will drop almost to ground. In other words, prior to closing the contact PB2, the voltage on the side 31 of the circuit 30 was at or above the holding voltage of the coil C1 and current was flowing through the coil C1. However, upon the closure of the contact PB2, light bulb L2 is brought into the circuit. Moreover, when the contact PB2 is initially closed, the resistance of the light bulb L2 is exceedingly low, e.g., 10 ohms. Thus, the side 31 is brought almost to ground. As a result, almost all current flow through the coil C1 ceases and the contact K1 is unlatched. Subsequently, the light bulb L2 is heated by the current flow therethrough and, as a result, its resistance increases significantly over a rather short period of time. At or before the end of the short period of time, the resistance of the light bulb L2 will increase to a value such that the voltage on the line 31 is at the pull-in voltage of the coil C2 and thus the contact K2 is pulled in and latched. Thereafter, the contact PB2 may be opened. Diodes D1, D2 and D3 may be provided in a DC embodiment of my invention, as shown in FIG. 2, to eliminate the effect of any ripple which may be present in the DC supply.

Similarly to the operation described above, it will be obvious that if, subsequent to the closing and latching of the relay contact K2, contact PB3 is initially closed, there will be a simultaneous opening and unlatching of the relay contact K2 as the line 31 is brought to essentially ground potential through the closed contact PB3 and the low resistance, initially unheated light bulb L3. Subsequently, light bulb L3 will undergo a rapid increase in resistance causing the voltage on the line 31 to rise. When the voltage on the line 31 rises to the pull-in voltage of the coil C3, relay contact K3 will be closed and the circuit 37 will be latched. Thereafter, contact PB3 may be opened.

Considering the circuit of FIG. 2 in view of the operating description hereinbefore presented, it will be appreciated that the circuit does thus provide the desired memory and and control function. That is to say, the memory function is provided by the latching of an appropriate relay in response to a discontinuous signal while the control function would be provided by any contacts associated with the coil of the latched relay. Moreover, by providing the light bulbs in parallel with and shunting the relay coils, the desired automatic unlatching of a previously latched relay is achieved and, as such, the memory portion of the circuit is automatically cleared upon the entry of a new command or input signal.

While certain specific elements have been employed in the embodiment of my invention as shown in FIG. 2, it will be evident that numerous equivalents thereof may be utilized depending upon the action which is desired or the actuating signal which is available. For example, in the embodiment of my invention as shown in FIG. 2, a contact or push button switches are employed to energize the relay coils by grounding the side of the relay coil which is connected to its associated relay contact. However, a clear equivalent would be to employ a transistor in place of the contact or push button switch. As an example of such an approach, a bipolar junction transistor could be employed wherein the collector was connected to the low potential side of the relay coil and the emitter was grounded. With such a configuration, a pulse provided to the base of the transistor could be used to switch the transistor between saturation and cutoff. Depending upon whether the transistor was a NPN or PNP transistor the associated pulse representing the command or input signal would be either positive or negative.

Similarly, with respect to the light bulbs shown in FIG. 2, other circuit elements could be employed in place thereof which would perform a similar function. In this connection, it will be appreciated that, stated in functional terms, the purpose of the light bulbs are to provide an initial low impedance to any current flow and subsequently to provide a final or steady state high impedance. Thus, it is convenient to define the phrase "current sensitive impedance means" to mean any circuit or circuit element which has an impedance which increases with current flow from an initial low impedance to a final or steady state high impedance. Thus, it will be seen that a light bulb falls within the scope of this defination. Similarly, a capacitor would provide the required action in that, with respect to DC current flow, a capacitor may be viewed as having an initial negligible impedance which increases with current flow to, what may be viewed as, a final or steady state infinite impedance. In the event that a capacitor is employed, it is conceivable that short term oscilations may exist from the resulting tank circuit. If this is found to be the case and if the oscilations persist for a time period which is objectionably long, such oscilations could be eliminated by a number of expedients, e.g., connecting the tank circuit to ground through a large capacitor which would look like a short circuit to any high frequency oscilations. Thus, with DC relays, a capacitor is an alternate circuit element which would provide the required current sensitive impedance.

Referring to FIG. 3, there is shown therein the preferred embodiment of my invention. Once again, for purposes of description, the relay circuit is comprised of only three branches 45, 46 and 47. From an inspection of the circuit shown in FIG. 3, it will be seen that there is a substantial resemblance to the circuit shown in FIG. 2. Thus, there is provided a DC power source V connected in series to a resistor R1. In series with R1 and the DC power source is a parallel relay circuit 40 having one side 41 and another side 42. Differing from the circuit of FIG. 2 however, the circuit of FIG. 3 has the other side 42 connected to ground through a zener diode Z. The zener diode Z is shunted by a resistor R3. Another difference resides in the provision of resistor R2 which is connected in parallel with the series circuit including R1 and the parallel relay circuit 40. A final difference distinguishing the preferred embodiment of my invention as shown in FIG. 3 from the circuit of FIG. 2 includes the provision of capacitors 50, 51 and 52 each of which shunts the contacts PB1, PB2 and PB3, respectively.

Although the operation of the preferred embodiment of my invention as shown in FIG. 3 is substantially similar to the operation of the embodiment shown in FIG. 2, the provision of the added circuit elements shown in FIG. 3 increases the operating speed of the circuit. For example, the provision of the parallel resistor R2 and the zener diode Z would increase the operating speed of the circuit for the following reason. Those skilled in the relay art will appreciate that there is associated with any particular relay coil a voltage referred to as the pull-in voltage. Generally speaking, the pull-in voltage is the minimum voltage which must exist across the relay coil in order for the coil to pull in the relay contacts associated therewith. Another voltage associated with most relay coils is the so called holding voltage, i.e., the minimum voltage which must be present across the relay coil in order to hold or maintain the associated contacts in their closed position. Stated otherwise, if the voltage across a relay coil is reduced to a value less than the holding voltage, the relay contacts associated therewith will open. With these considerations in mind, it will be observed that in the circuit of FIG. 3 a continuous current flow path is provided from the power source V through the resistor R2 and through the zener diode Z to ground. Thus, the zener diode Z functions to maintain the low potential side 42 of the relay circuit 40 at some voltage above ground. For example, assume that the zener diode Z has a breakdown voltage of 4 volts and, in operation, the zener diode Z is operating in its breakdown region. Thus, the low potential side 42 of the relay circuit 40 is maintained at 4 volts. Additionally, let it be assumed that the holding voltage for the coils C1, C2 and C3 is two volts and when one of the contacts K1, K2 or K3 is closed, the voltage on the high potential side 41 of the relay circuit 40 is 8 volts. Thus, under such a condition, a voltage of four volts would exist across the coil of any relay whose contact was closed, for example coil C1. Since the assumed holding voltage for the coil C1 is two volts, it is clear that the four volt potential difference across the coil C1 is sufficient to hold or maintain the associated contacts in a closed condition. However, with respect to unlatching the contacts associated with the coil C1, it will be appreciated that the voltage on the high potential side 41 will only have to be diminished to slightly less than six volts in order to unlatch the contacts associated with the coil C1. Therefore, the time required to achieve a drop out or unlatching of any previously closed coil is reduced. As such, by providing the zener diode Z and the by-pass resistor R2 the operating speed of the circuit is increased. A resistor R3 may be provided in parallel with the zener diode Z to prevent overloading of the zener diode.

The circuit of FIG. 3 operates in substantially the same manner as the circuit of FIG. 2. Thus, assume that contact K1 had been closed and latched. Subsequently, a new input or command signal may be supplied in the form of a momentary closure of the contact PB2. Prior to the closure of contact PB2, a voltage would be present at the high potential side of the relay circuit 40, e.g., eight volts. As a result, a potential of eight volts would exist across capacitor 51. When contact PB2 is momentarily depressed, two events would occur almost simultaneously. First, the charge on the capacitors 50, 51 and 52 would discharge to ground through the closed contact PB2. Second, the voltage in the high potential side 41 would be reduced to approximately zero because of the initial low resistance of the light bulb L2. While PB2 is closed, current flows through the light bulb L2 and the resistance of the light bulb L2 will increase resulting in an increase in current flow through the coil C2. When the current flow through coil C2 has reached a particular level or, stated otherwise, when the resistance of the light bulb L2 has increased to a value such that the voltage of the line 41 is equal to the pull-in voltage of the coil C2, the coil C2 will pull in the associated contact K2 and the relay will be latched. While PB2 is depressed, capacitor 51 remains uncharged while capacitors 50, 52 charge with the increasing voltage on line 41. Thus, the initial short circuit provided by capacitor 51 when PB2 is opened may permit a decrease in the minimum time of PB2.

In view of the above described operation, it will be apparent that the effect of providing the capacitors 50, 51 and 52 in parallel with the contacts PB1, PB2 and PB3, respectively, is a reduction in the time required during which the contacts PB1, PB2 and PB3 must be closed in order to obtain operation of the circuit. In the circuit of FIG. 3, the unlatching of the contact K2 and the latching of any other relay in the circuit may be achieved as heretofore described, i.e., by closing either contact PB1 or PB3.

With reference to the circuit of FIG. 3, Table 1 below lists values of the various circuit elements which may be employed or, where appropriate, the types of elements.

TABLE 1

| ITEM | TYPE |
|---|---|
| R1 | 125 ohms |
| R2 | 15k ohms |
| R3 | 47 ohms |
| L1, L2, L3 | No. 47 Pilot Lamp 12 v, 160 ma |
| D1, D2, D3 | Motorola HEP 156 |
| 50, 51, 52 | 25 microfarad |
| Z | Motorola, HEP 102 |
| V | 28 v, ma |
| C1, C2, C3 | Wheelco Data Switch 120 ohm, 47 ma |

The particular relay specified above is a reed type relay having a holding voltage of approximately 2 volts. Using such a relay and circuit elements of the type specified in Table 1 above, a circuit as shown in FIG. 3 will have an operating time of approximately 10 milliseconds. In other words, a contact closure of approximately 10 milliseconds or more will be sufficient to unlatch any previously closed relay as well as closing and latching the relay associated with the contact which is closed.

Although it has hereinbefore been indicated that a number of circuits or circuit elements may be used in place of a light bulb, I prefer to use a light bulb since it is both low in cost and provides a simultaneous, visual indication as to the status of the relay matrix which comprises the relay circuit.

While there has hereinbefore been described certain embodiments of my invention, other embodiments thereof will be evident to those skilled in the art to which this invention pertains. For example, as previously indicated, the diodes shown in FIG. 2 and FIG. 3 may be omitted if a substantially ripple free source of DC power is available. Similarly, the embodiment of FIG. 2 contemplates the use of DC relays and a DC power source. However, AC relays and and AC source of power could be employed, in which event, diodes D1, D2 and D3 would be omitted. Moreover, if the circuit of FIG. 2 were adapted for use with an AC power source, the speed-up advantage of the zener diode of the embodiment of FIG. 3 could be achieved by interposing a clamping circuit between the line 32 and ground.

Although the preceeding description of my invention uses such terms as high potential or low potential, it will be appreciated that such terms are used in their relative sense, i.e., to denote a potential difference. Thus, any polarity which produces the required circuit action is comprehended by such terminology. Similarly, it will be appreciated that the word ground has been used herein to refer to a reference or circuit ground which may or may not be a zero ground.

Having set forth a number of embodiments of my invention, the scope of my invention is defined by the claims appended hereto.

I claim:

1. A circuit for selectively actuating a plurality of relay contacts comprising:

a. a power source;
b. a resistor in series with said power source;
c. a relay circuit in series with said resistor and said power source, said relay circuit comprising a plurality of parallel circuits, each one of said parallel circuits comprising,
   i. a relay coil operatively paired with one of said relay contacts and connected at one end to one side of said one parallel circuit,
   ii. a maintaining relay contact, operatively associated with said relay coil and connected in series with the other end of said relay coil and the other side of said one parallel circuit,
   iii. switch means shunting said maintaining relay contact, and
   iv. current sensitive impedance means shunting said relay coil for initially shorting any previously energized relay when said switch means is closed whereby a previously energized relay is deenergized before another relay is energized.

2. The circuit of claim 1 wherein said power source is a DC power source and said relays are DC relays.

3. The circuit of claim 2 wherein said current sensitive impedance means is a capacitor.

4. The circuit of claim 3 wherein said energizing means is a switch connected between ground and said other end of said relay.

5. The circuit of claim 4 which further includes a capacitor shunting said switch.

6. The circuit of claim 2 wherein said current sensitive impedance means is a light bulb.

7. The circuit of claim 6 wherein said energizing means is a switch connected between ground and said other end of said relay.

8. The circuit of claim 7 which further includes a capacitor shunting said switch.

9. The circuit of claim 7 which further includes means for maintaining said other side of said relay circuit at a potential above ground.

10. The circuit of claim 9 wherein said means for maintaining an above the ground potential comprises a zener diode connected between ground and said other side of said relay circuit.

11. The circuit of claim 10 which further includes a capacitor shunting said switch.

* * * * *